(No Model.)

2 Sheets—Sheet 1.

G. W. LOWER.
MEAT SLICING MACHINE.

No. 244,270.

Patented July 12, 1881.

Witnesses
Wm. P. Logan
Harry Smith

Inventor
George W. Lower
by his Attorneys
Howson and Sons (No Model.) 2 Sheets—Sheet 2.

G. W. LOWER.
MEAT SLICING MACHINE.

No. 244,270. Patented July 12, 1881.

Witnesses
Wm. P. Logan
Harry Smith

Inventor
George W. Lower
by his Attorneys
Howson and Sons

UNITED STATES PATENT OFFICE.

GEORGE W. LOWER, OF PHILADELPHIA, PENNSYLVANIA, ASSIGNOR TO THE ENTERPRISE MANUFACTURING COMPANY, OF SAME PLACE.

MEAT-SLICING MACHINE.

SPECIFICATION forming part of Letters Patent No. 244,270, dated July 12, 1881.

Application filed May 19, 1881. (No model.)

*To all whom it may concern:*

Be it known that I, GEORGE W. LOWER, a citizen of the United States, residing in Philadelphia, Pennsylvania, have invented certain Improvements in Meat-Slicing Machines, of which the following is a specification.

My invention relates to an improvement in the meat-slicing machine for which Letters Patent No. 168,433, were granted to C. R. Turner October 5, 1875, and also in the Patent No. 210,078, granted to the Enterprise Manufacturing Company November 19, 1878; and the object of my improvement is to maintain the blade of the pivoted knife-frame in proper contact with the faced rib of the fixed end frame of the machine for obtaining a proper cutting effect, a further object of my invention being to relieve the pivot-pin of the knife-frame from undue strains.

Figure 1:
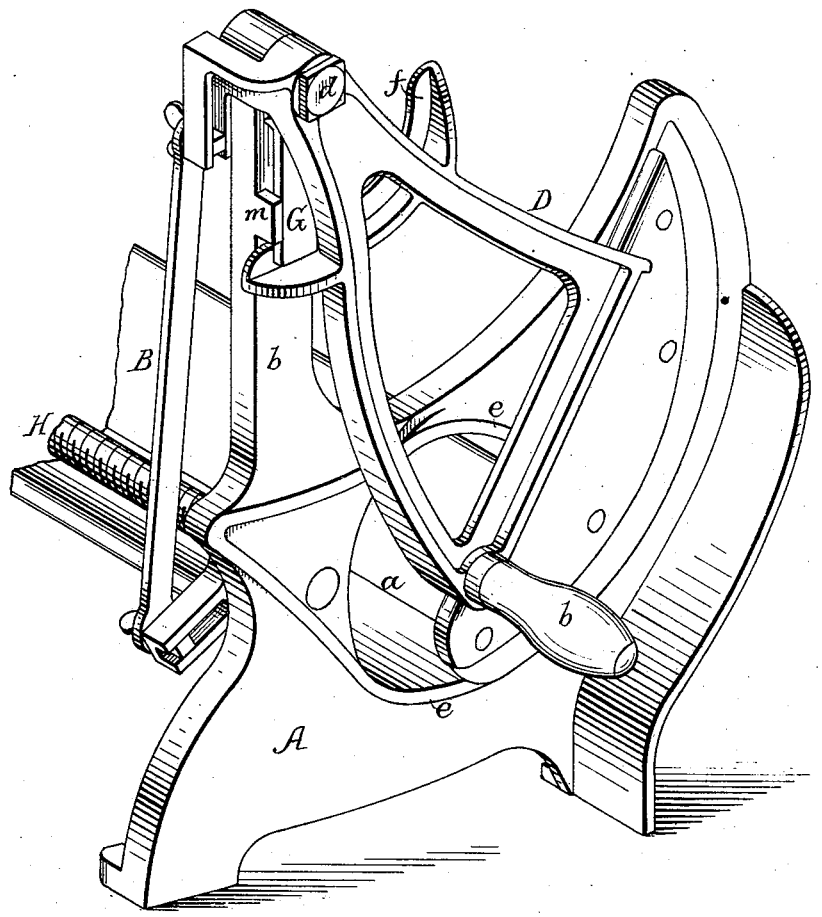
Figure 2:
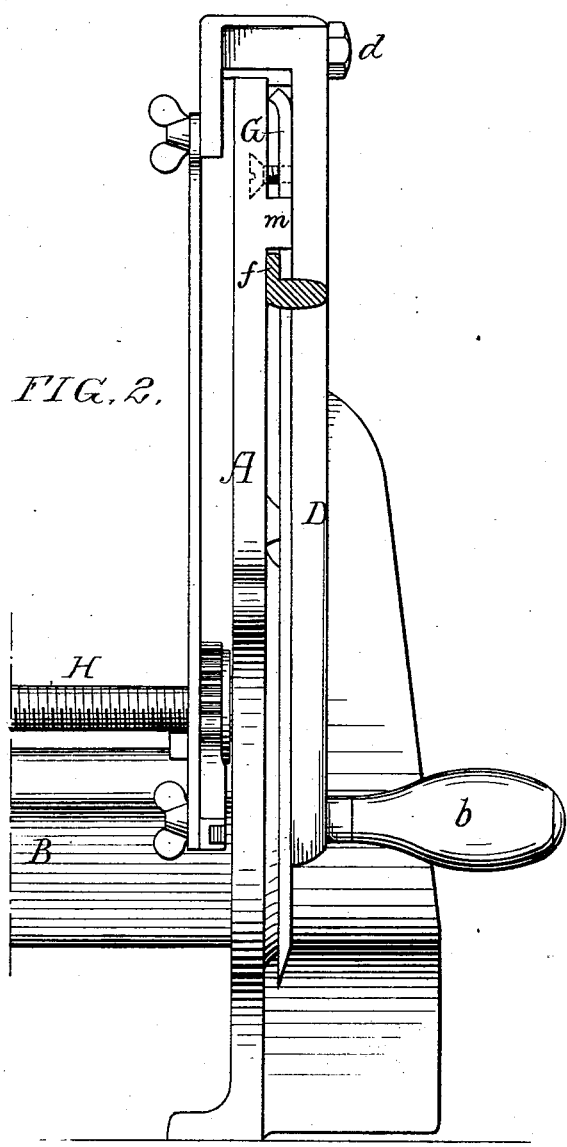
Figure 3:
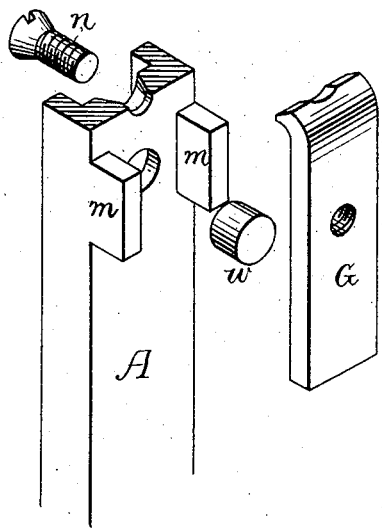

In the accompanying drawings, Figure 1, Sheet 1, is a perspective view of sufficient parts of a meat-slicer to illustrate my invention; Fig. 2, a side view of Fig. 1; Fig. 3, perspective views of detached parts of Fig. 1, and Fig. 4 a view showing a modification of my invention.

A represents the end frame of the slicing-machine, and B part of the trough along which the meat is fed through an opening, *a*, in the end frame as the frame D, carrying the knife, is vibrated by means of the handle *b*. The blade should move in contact with a faced rib, *e*, by which the opening *a* in the end frame is bounded, in order that the meat may be properly sliced; and a difficulty has been experienced in machines of the class to which my invention relates in maintaining the blade in proper contiguity with the rib, owing to the necessity of pivoting the knife-frame to an extension of the end frame by a pin, *d*, situated at a distance from the edge of the blade. In order to overcome this difficulty I cast or secure to the back of the knife-frame a segmental flange, *f*, concentric with the pivot *d*, and this flange is overlapped by the lower portion of a plate, G, attached to the end frame, thereby preventing the outward movement of the knife-frame without interfering with the free vibration of the same and keeping the blade in proper contiguity with the faced rib *e*.

In order to prevent undue pressure on the segmental flange *f* of the knife-frame, I use the loose plate G, which is confined between lugs *m m* on the extension of the end frame, between which and the plate is interposed a block, *w*, of rubber or other equivalent elastic medium, the upper bent end of the plate bearing against the said extension of the end frame, through which a screw, *n*, passes into the plate G. On tightening this screw the lower end of the plate will be forced against the segmental rib of the knife-frame, but through an elastic medium; hence the blade can be so adjusted to the faced rib as to be in proper contact therewith without producing undue friction, which might be the case in the absence of the elastic medium *w*.

Figure 4:
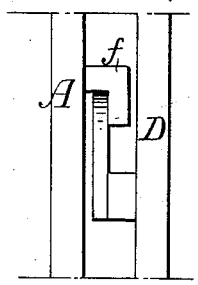

The segmental rib may be cast on or secured to the end frame of the machine, as shown in Fig. 4, and may overlap a plate on the knife-frame; but I prefer to cast the segmental rib on the knife-frame, as shown. In either case the strain on the pivot-pin due to the tendency of the knife-frame to move outward from the end frame will be obviated, and the blade will always be in the best position to perform its duty thoroughly.

The screw H and the follower connected therewith are for feeding the meat along the trough; but as this screw and the mechanism for operating the same form no part of my present invention, it will be unnecessary to further refer to them.

I claim as my invention—

The combination, in a meat-slicing machine, of the end frame, A, and pivoted knife-frame D, with a segmental flange on one and an adjustable plate overlapping the flange on the other, said plate being acted on by a spring, whereby undue friction between the flange and plate is prevented, as set forth.

In testimony whereof I have signed my name to this specification in the presence of two subscribing witnesses.

GEO. W. LOWER.

Witnesses:
 WM. P. LOGAN,
 HARRY SMITH.